United States Patent [19]

Decher et al.

[11] Patent Number: 4,941,997

[45] Date of Patent: Jul. 17, 1990

[54] AMPHIPHILIC AZO DYES AND MOLECULAR AGGREGATES THEREOF

[75] Inventors: Gero Decher, Walluf, Fed. Rep. of Germany; Bernd Tieke, Marly, Switzerland

[73] Assignee: Ciba-Geigy Corporation, Ardsley, N.Y.

[21] Appl. No.: 215,672

[22] Filed: Jul. 6, 1988

[30] Foreign Application Priority Data

Jul. 13, 1987 [CH] Switzerland ........................ 2656/87

[51] Int. Cl.[5] .................... C02B 27/28; C09B 29/085; C07C 245/08

[52] U.S. Cl. ...................................... 252/586; 252/70; 252/408.1; 252/585; 252/960; 252/582; 264/1.3; 350/371; 534/573; 534/856; 564/441

[58] Field of Search ........................... 534/573 L, 856; 252/582, 70, 408.1, 960, 585, 586; 564/441; 514/410

[56] References Cited

U.S. PATENT DOCUMENTS 3,148,179 9/1964 Carboni ......................... 534/856 X

FOREIGN PATENT DOCUMENTS 953719 4/1964 United Kingdom ................ 534/856

OTHER PUBLICATIONS

Thin Solid Films, 134, 27–34 (1985), Imazaki et al.
Thin Solid Films, 121, L89–91 (1984), Kunitake et al.
Ber. Bunsenges. Phys. Chem., 87, 1134–43 (1983).
Andreas Schuster, Diplomarbeit, pp. 18–19, Mainz 1986.
Spie, vol. 682, 160–9 (1986), Small et al.
Spie, vol. 682, 97–100 (1986).
Andre Laschewky, Dissertation, p. 13, Mainz 1986.

*Primary Examiner*—Floyd D. Higel

*Attorney, Agent, or Firm*—Steve O'Brien

[57] ABSTRACT

The invention relates to compounds of formula I (I)

wherein $R^1$ is $C_{12}$–$C_{30}$alkyl, $R^2$ is hydrogen or $C_1$–$C_{30}$alkyl, $R^3$ is $C_1$14 Calkyl or $C_1$–$C_3$alkoxy, $R^4$ may have one of the meanings of $R^3$ or is halogen, k and n are each independently of the other 0, 1 or 2, and $R^5$ and $R^6$ are each independently of the other $C_1$–$C_4$alkyl, any of which alkyl groups as defined herein may also be partly fluorinated or perfluorinated, with the proviso that $R^1$ is alkyl of not less than 18 carbon atoms if $R^2$ is hydrogen or alkyl of less than 12 carbon atoms.

From these compounds it is possible to prepare molecular aggregates, especially LB layer systems, which have reversible thermochromic and solvatochromic properties. The invention also relates to intermediates of formula II (II)

wherein $R^1$, $R^2$, $R^3$ and n are as defined above.

2 Claims, No Drawings

AMPHIPHILIC AZO DYES AND MOLECULAR AGGREGATES THEREOF

The present invention relates to novel amphiphilic azo dyes, to intermediates for such azo dyes, to molecular aggregates of said azo dyes, and to the use of said aggregates as optical sensors.

Amphiphilic azobenzenes are known. The suitability of such azobenzenes which contain quaternary ammonium groups for the formation of ordered structures is described by T. Kunitake et al. in Thin Solid Films, 121, L89–91 (1984) and by M. Shimomura et al. in Ber. Bunsenges. Phys. Chem., 87, 1134–1143 (1983). Langmuir-Blodgett layer systems of mononitroazobenzenes are known from SPIE Vol. 682, 97–102 and 160–169 (1986).

Thermochromism and solvatochromism in multilayer systems that are built up by the Langmuir-Blodgett technique (LB layers) are described by S. Imazeki et al. in Thin Solid Films, 134, 27–34 (1985). These layers are composed of merocyanine dyes.

So far only a few reversible procedures in LB multilayers are known, as such layer systems normally permit only insignificant molecular movements without the structure being disrupted. It has hitherto been possible to observe thermochromism in LB layers in only one direction, viz. when the layers are heated. It was therefore surprising to find that selected amphiphilic azobenzene dyes in such layer systems or in other systems containing bilayer membranes exhibit reversible thermochromism and solvatochromism and that conversion proceeds very rapidly on heating the layers.

The present invention relates to compounds of formula I

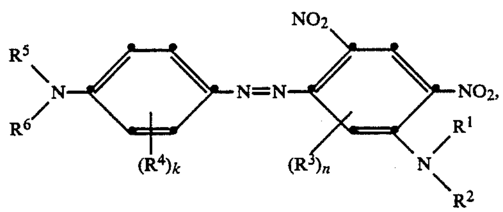

wherein $R^1$ is $C_{12}$–$C_{30}$alkyl, $R^2$ is hydrogen or $C_1$–$C_{30}$alkyl, $R^3$ is $C_1$–$C_3$-alkyl or $C_1$–$C_3$alkoxy, $R^4$ may have one of the meanings of $R^3$ or is halogen, k and n are each independently of the other 0, 1 or 2, and $R^5$ and $R^6$ are each independently of the other $C_1$–$C_4$alkyl, any of which alkyl groups as defined herein may also be partly fluorinated or perfluorinated, with the proviso that $R^1$ is alkyl of not less than 18 carbon atoms if $R^2$ is hydrogen or alkyl of less than 12 carbon atoms.

The alkyl radicals defined herein may be straight chain or branched radicals. Straight chain radicals are preferred.

The alkyl radicals may also be partially fluorinated or perfluorinated or they may contain one or more trans-double bonds or triple bonds which are not in 1-position. Several trans-double bonds or triple bonds may be isolated or conjugated with one another.

Specific examples of alkyl radicals are: methyl, ethyl, n-propyl, isopropyl, n-butyl, isobutyl, n-pentyl, n-hexyl, n-heptyl, n-octyl, 2-ethylhexyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl, n-docosyl, n-tetracosyl, n-hexacosyl, n-octacosyl and n-triacontyl, as well as the corresponding perfluorinated derivatives or allyl, propargyl, octadec-9-transenyl or octadec-9,11-diinyl.

$R^3$ and $R^4$ as $C_1$–$C_3$alkyl may be methyl, ethyl or n-propyl. Methyl is preferred.

$R^3$ and $R^4$ as $C_1$–$C_3$alkoxy may be methoxy, ethoxy or n-propoxy. Methoxy is preferred.

$R^4$ as halogen is fluorine, chlorine, bromine or iodine. Bromine or chlorine is preferred.

$R^5$ and $R^6$ as $C_1$–$C_4$alkyl are preferably methyl, ethyl, n-propyl or n-butyl. Methyl is preferred.

$R^2$ is preferably $C_1$–$C_{30}$alkyl.

$R^1$ and $R^2$ are preferably radicals of formula —$C_pH_{2p+1}$—, wherein p is 12 to 30, preferably 16 to 26 and, most preferably, 18 to 22. Such radicals are preferably straight chain.

$R^1$ and $R^2$ must have a certain minimum chain length in order that stable monomolecular films of compounds of formula I may form on the surface of the water. If $R^2$ is hydrogen or a short-chain alkyl radical of less than 12 carbon atoms, then $R^1$ must contain at least 18 carbon atoms.

Preferred compounds of formula I are those wherein $R^1$ and $R^2$ contain the same number of carbon atoms.

The indices k and n are preferably 0 or 1 and, most preferably, are both 0.

More preferred compounds of formula I are those wherein $R^1$ and $R^2$ are each independently of the other n-$C_{16}$–$C_{26}$alkyl and $R^5$ and $R^6$ are methyl.

Particularly preferred compounds of formula I are those wherein $R^1$ and $R^2$ are each independently of the other a radical of formula —$C_qH_{2q+1}$, wherein q is an integer from 16 to 26.

The most preferred compounds of formula I are those wherein q is an integer from 18 to 22.

The compounds of formula I can be prepared in a manner known per se by coupling diazonium compounds of formula IIa with amines of formula IIb in accordance with the following reaction scheme:

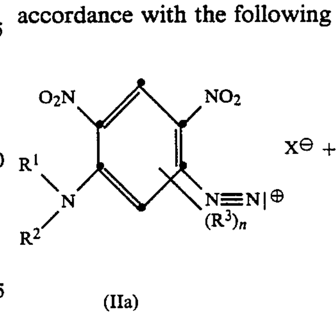

(IIa)

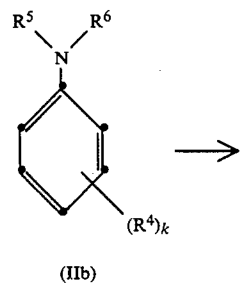

→

(IIb)

-continued

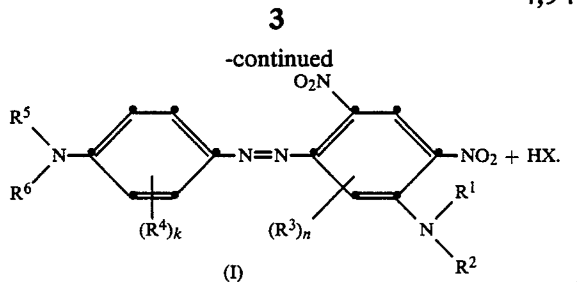

In formulae I, IIa and IIb, $R^1$ to $R^6$, k and n are as defined above and X is any anion.

The diazonium compounds of formula IIa can be obtained in a manner known per se from primary amines of formula II in accordance with the following reaction scheme:

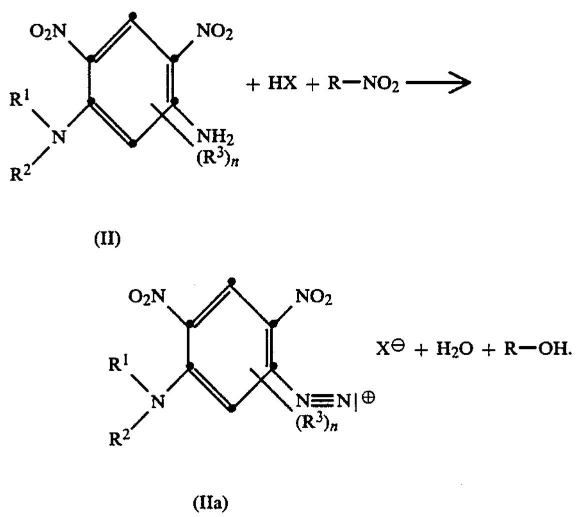

The compounds of formula II are novel and likewise constitute an object of this invention.

These compounds can be obtained in a manner known per se by reacting dinitrohalobenzenes of formula III with primary or secondary amines of formula IV in accordance with the following reaction scheme:

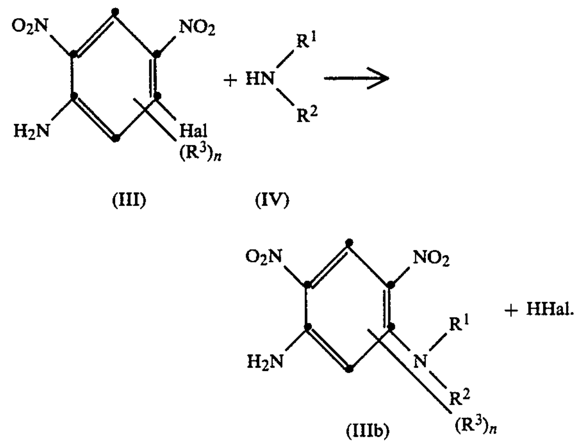

In the above formulae, $R^1$, $R^2$, $R^3$ and n are as defined above and Hal is fluorine, chlorine or bromine, with fluorine being preferred.

The compounds of formulae III and IV are known per se and some are commercially available. Those compounds of formulae III and IV that are not commercially available can be prepared by standard reactions of organic chemistry.

Thus, for example, the 3-halo-4,6-dinitroanilines of formula III can be obtained by converting 1,3-dihalobenzenes into the corresponding 1,3-dihalo-4,6-dinitrobenzenes by dinitration and subsequently replacing a halogen atom by an amino group. Examples of such reactions are to be found in Houben-Weyl, Methoden der organischen Chemie, Vol. X/1, p. 513, and Vol. XI/1, p. 63, Georg Thieme Verlag, Stuttgart, 1971.

Primary amines of formula IV are obtained, for example, by alkylation of phthalimides and subsequent hydrolysis to give the amines.

Secondary amines of formula IV are obtained, for example, by reduction of N-monoalkylated acid amides with $LiAlH_4$.

The diazotisation of the compound of formula II is normally effected in an inert organic solvent, preferably diethyl ether. In this variant, it is customary to use organic nitrites $RNO_2$. Isoamyl nitrite is preferred.

As acid HX it is preferred to use a mineral acid, for example perchloric acid, $HBF_4$ or, most preferably, sulfuric acid.

The coupling with the amine is normally carried out without further isolation of the diazonium compound.

The reaction of the compounds III and IV is conveniently carried out in an inert organic solvent. It is preferred to use mixtures of polar aprotic solvents and halogenated hydrocarbons, for example a 1:1 mixture (parts by weight) of dimethyl formamide and chloroform. A sufficient amount of base is usually added to neutralise the hydrogen halide that forms.

From the compounds of formula I it is possible to prepare ultrathin layers with reversible thermochromic properties. The thickness of these layers can be as little as the length of a molecule. Depending on the number and length of the hydrocarbon radicals $R^1$ and $R^2$, monolayers are able to form at the water/air interface. To this end, a small amount of a solution of a compound of formula I in a preferably low boiling, water-immiscible solvent is applied in a manner known per se to the free surface of a water subphase, the solvent is allowed to evaporate, and the resultant film is compressed such that a stable, monomolecular layer forms on the surface of the water subphase.

It is common knowledge that the stability of the films can be influenced by choice of the experimental parameters. Thus, for example, films composed of relatively short-chain compounds of formula I can be stabilised by cooling the subphase, or compounds of formula I are used in conjunction with other amphiphilic compounds that are able to stabilise the monomolecular films. Examples of such compounds are long-chain carboxylic acids such as palmitic acid, stearic acid, arachidic acid or behenic acid, or the esters, in particular the methyl esters, of said acids; long-chain primary amines such as n-hexadecylamine, n-octadecylamine or n-eicosylamine; long-chain alcohols such as n-hexadecanol, n-octadecanol or n-eicosanol; long-chain aliphatic hydrocarbons such as hexadecane, octadecane or eicosane; or steriods and steriod derivatives such as cholesterol. Besides saturated derivatives, it is also possible to use ethylenically or acetylenically unsaturated derivatives of these compounds, for example ω-tricosenoic acid or the esters thereof. The acids are preferably used in the form of salts, in particular cadmium salts.

Such mixtures normally contain the compounds of formula I in an amount of at least 1% by weight, based on the total mixture.

Monomolecular layers present on the surface of a water subphase can be transferred to solid substrates by the Langmuir-Blodgett technique (LB technique). This is done by dipping a solid substrate having a substantially smooth surface, in a manner known per se, into a water subphase having on the surface thereof a compressed monomolecular film, whereby said film is transferred to the substrate.

Multilayer systems can be prepared by repeated immersion and withdrawal of the substrate.

The layer on the surface of the water subphase can be replaced after each immersion, so that different orders of layers can be deposited on to the substrate.

Depending on the polarity of its surface, the substrate is withdrawn from the water in the first dipping operation (hydrophilic substrate), so that the polar azobenzene chromophores are in contact with the polar surface of the substrate or, in the first dipping operation, the substrate is immersed in the water subphase through the monolayer (hydrophobic substrate), so that the hydrophobic radicals $R^1$ and $R^2$ are in contact with the surface of the substrate. These procedures are known to the skilled person in the field of LB systems and are described, for example, in Techniques of Chemistry, Physical Methods of Chemistry, Vol. I, Part 3B, pp. 666–671, ed. A. Weissberger and P. Rossiter.

Suitable solid substrates for the LB technique are a very wide range of substrates having microscopically planar surface. Examples of such substrates are metals such as aluminium, copper, silver or gold; semiconductors such as germanium, silicon or GaAs; inorganic materials such as glass, quartz, ZnSe or $Si_2N_3$; or plastics materials such as Teflon ®, polyethylene or polyester. It is also possible to use substrates which have been made hydrophobic, for example glass or quartz which has been pretreated with trichloromethylsilane, dichlorodimethylsilane or trichlorooctadecylsilane.

The subphase on which the monolayer is formed, consists normally of multidistilled water to which small amounts of salts, for example $CdCl_2$ or $BaCl_2$, may be added to stabilise the films. The subphase can also contain buffer substances, for example $NaHCO_3$. These modifications are known to the skilled person and are chosen in accordance with the nature of the film-forming substances.

Surprisingly, multilayers can be prepared from pure dye monolayers by the LB technique. These layers may be in direct sequence or they can be alternating layers of dye monolayers and other layer-forming materials. Composite layers can also be used.

Preferred mixtures for the preparation of such layer systems are mixtures of the compound of formula I, especially the derivative thereof, wherein $R^1$ and $R^2$ are -n-$C_{18}H_{37}$ and $R^5$ and $R^6$ are methyl, with arachidic acid or with cholesterol.

The present invention relates to a process for the preparation of monolayer or multilayer systems, comprising the steps of (i) preparing a monolayer of a compound of formula I or of a mixture of at least 1% by weight, based on the total mixture, of said compound in conjunction with further amphiphilic compounds capable of forming stable monolayers, and (ii) transferring said layer to a solid substrate by the Langmuir-Blodgett technique by single or repeated immersion and/or withdrawal of said substrate through the layer.

Mixed liposomes or crystalline films can also be prepared from the compounds of formula I.

A further process according to this invention relates to the preparation of molecular aggregates in the form of mixed liposomes. A preferred process comprises the steps of (i) introducing a solution of a compound of formula I in conjunction with further liposome-forming compounds into an aqueous medium, (ii) producing a homogeneous film of the liposome-forming material by evaporation of the solvent, (iii) ultra-sonicating the assembly or inducing swelling of the liposome-forming materials at temperatures below the phase transfer temperature to effect liposome formation, and (iv) in an optional step, transferring the solution to a solid substrate and evaporating the water, so that a cast bilayer film is formed.

The further liposome-forming compounds used in this process are known per se to the skilled person. Examples of such compounds are dimethyl dioctadecylammonium bromide or dipalmitoyl phosphatidylcholine.

Processes for the preparation of liposomes are described, for example, in "Liposome Technology", Vol. 1, CRC Press, Baton Rouge (1984), ed. G. Gregoriadis.

Solutions containing liposomes of compounds of formula I or mixtures thereof with other amphiphilic compounds can be cast to films after their preparation, and cast bilayer films are obtained after evaporation of the solvent. This technique is described in the article mentioned above by T. Kunitake et al.

The present invention further relates to a process for the preparation of microcystalline films, comprising the steps of (i) applying a compound of formula I to a solid, preferably hydrophobic, substrate, (ii) fusing the compound of formula I, (iii) contacting this assembly with a second solid, preferably hydrophobic, substrate to effect formation of a thin liquid film between said substrates, and (iv) cooling the compressed film to a temperature below the melting point of the compound of formula I.

The hydrophobic substrates referred to above can be used in this embodiment of the invention, for example plastics films or glass plates which have been made hydrophobic. A mixture of compounds of formula I with other amphiphilic compounds can also be processed by this method.

Aggregates of the azo compounds of formula I form in the LB films. The absorption behaviour of the film is influenced by the mode of aggregation. Surprisingly, the aggregation can be reversibly controlled by choice of ambient conditions such as temperature or pH, and is seen in a change in the absorption spectrum.

This effect is not limited to LB films on solid substrates. It also occurs in crystalline films or in aggregation forms of the compound of formula I in which bilayer membranes are formed, for example liposomes. Hence not only the Langmuir-Blodgett technique is suitable for the preparation of thermochromic layers of compounds of formula I.

The molecular aggregates of compounds of formula I may be in the form of a monolayer of compounds of formula I or of mixtures containing at least 1% by weight, based on the total mixture, of compounds of formula I in conjunction with other layer-forming amphiphilic compounds on a solid substrate.

The molecular aggregates of compounds of formula I may also be systems containing bilayer membranes of compounds of formula I or of mixtures containing at least 1% by weight, based on the entire mixture, of said compounds in conjunction with further amphilic compounds.

Molecular aggregates are preferred in which the bilayer membranes are multilayer systems which can be prepared by the Langmuir-Blodgett technique.

Further preferred molecular aggregates based on systems containing bilayer membranes are mixed liposomes or microcrystalline films.

Accordingly, the invention also relates to molecular aggregates of compounds of formula I, which are arranged in the form of mixed liposomes, microcrystalline films, or in particular, of Langmuir-Blodgett layers.

The molecular aggregates of this invention can be used for the preparation of ultrathin layers having solvatochromic and thermochromic properties. When arranged in layers, the compounds of formula I exhibit thermochromism at temperatures below their melting point. The effect is especially pronounced in double long-chain alkylated derivatives. Besides the thermochromism, a strong dependence of the absorption of the aggregates on the nature of the surface of the substrate is observed. The layers can therefore be used for the visual assessment of defects on the surfaces of solid substrates.

Further, a dependence of the absorption of these aggregates on the pH of the environment is observed. The layers or systems containing the bilayer membranes formed from these aggregates can therefore also be used as pH indicators.

Orientated, non-centrosymmetric arrays of compounds of formula I, for example compounds of formula I assembled in the form of alternating LB layers, exhibit non-linear optical properties. When monolayers are transferred by the LB technique, the compounds of formula I are aligned and optically anisotropic layers are formed. These layers can be used as polarisers. Such thin-layer polarisers are of interest for the production of integrated optical components.

Accordingly, the invention also relates to the use of the molecular aggregates as thermosensors or for the visual assessment of defects on the surfaces of solid substrates or as pH indicators, as well as to the use of the compounds of formula I, assembled in the form of LB layers, as polarisers.

The invention is illustrated by the following Examples.

SYNTHESIS OF THE COMPOUNDS

1. Preparation of the intermediates

Example 1.1: Preparation of 2,4-dinitro-5-amino-N,N-bis(octadecylaniline)

A mixture of 1.2 g (6 mmol) of 2,4-dinitro-5-fluoroaniline (Fluka, puriss.), 3.7 g (7.2 mmol) of N,N-bis(octadecylamine) (Fluka, pract.) and 1 g of $NaHCO_3$ is suspended in 15 ml of a 1:1 mixture of abs. DMF/abs. chloroform and the suspension is stirred for 90 minutes at 70° C. After cooling a 1:1 mixture of ether and water/saturated NaCl solution is added and then the ethereal phase is extracted twice with water/NaCl solution. The ethereal phase is dried over $MgSO_4$, the solvent is removed by distillation, and the residue is chromatographed over the 50-fold amount of silica gel with a 8:1 mixture of hexane/ether as eluant, to give 3.1 g (71% of theory) of a yellowish orange wax-like substance. Melting point: 53°-56° C.; $R_f$ (silica gel; 1:1 mixture of hexane/ether): 0.78.

Elemental analysis: theory: C 71.33%; H 11.10%; 8.20% found: C 71.75%; H 11.18%; 7.97%.

Example 1.2: Preparation of 2,4-dinitro-5-amino-N,N-bis(docosylaniline)

The procedure of Example 1.1 is repeated, using N,N-bis(docosylamine)* in place of N,N-bis(octadecylamine). Chromatography yields a yellow, microcrystalline substance (yield: 47% of theory; m.p. 82°-83° C.).

Elemental analysis: calculated for $C_{50}H_{94}N_4O_4$ (mol. wt. 815.33): 73.66% C; 11.62% H; 6.87% N found: 73.68% C, 11.68% H; 6.75% N.

Example 1.3: Preparation of 2,4-dinitro-5-amino-N,N-methyldocosylaniline

The procedure of Example 1.1 is repeated, using N,N-methyldocosylamine* in place of N,N-bis(octadecylamine). For purification, the crude product is not chromatographed, but is recrystallised repeatedly from ethanol to give yellow crystals (yield: 49% of theory; m.p. 87°-89° C.).

Elemental analysis: calculated for $C_{29}H_{52}N_4O_4$ (mol. wt. 520.76): 66.89% C; 10.07% H; 10.76% N found: 66.28% C; 9.95% H; 10.84% N.

Example 1.4: Preparation of 2,4-dinitro-5-amino-N-docosylaniline

The procedure of Example 1 is repeated, using 1-docosylamine* in place of N,N-bis(octadecylamine). For purification, the crude product is not chromatographed, but recrystallised repeatedly from ethanol to give a yellow, microcrystalline solid (yield: 85% of theory; m.p. 108°-110° C.).

Elemental analysis: calculated for $C_{28}H_{50}N_4O_4$ (mol. wt. 506.74): 66.37% C; 9.95% H; 11.06% N found: 66.36% C; 10.00% H; 11.02% N.

(*) The preparation of the long-chain amines is effected by reduction of the corresponding acid amides with $LiAlH_4$ in tetrahydrofuran by standard methods. The acid amides are prepared via the acid chlorides. All amines are recrystallised repeatedly from ethanol before the reaction.

2. Preparation of the azo compounds

Example 2.1: Preparation of 2,4-dinitro-5-N,N-bis(octadecylamino)-4'-N',N'-dimethylaminoazobenzene 1.0 g (1.4 mmol) of 2,4-dinitro-5-amino-N,N-bis(octadecylaniline) are dissolved in 50 ml of diethyl ether with gentle heating and the solution is cooled, with vigorous stirring, to −5° C., whereupon a portion of the substance precipitates in finely crystalline form. Then 0.34 g of conc. $H_2SO_4$ (dissolved cold in 5 ml of ether) are added dropwise at −5° to 0° C. The resultant yellow suspension is stirred for 10 minutes at 0° C. Then 0.18 g (1.5 mmol) of isoamyl nitrite (Fluka, purum) in 5 ml of ether are added dropwise at 0° C., whereupon a deep brownish red suspension forms. This suspension is stirred for 30 minutes at 0° C. and subsequently 0.85 g (7 mmol) of dimethyl aniline (Fluka, puriss.) is added dropwise at 0° C., and stirring is continued for 30 minutes at 0° C. and for 60 minutes at room temperature. After addition of 50 ml of ether, the ethereal phase is extracted twice with 2N HCl and twice with water. After drying over $MgSO_4$ and removing the ether by distillation, the crude product is chromatographed over the 100-fold amount of silica gel with hexane as eluant. The red fractions obtained are chromatographed a second time with a 98:2 mixture of hexane/ether to give 240 mg (21% of theory) of a deep red, wax-like substance.

$R_f$ (silica gel, 2:1 mixture of hexane/ether): 0.52.

Elemental analysis: found C 71.68%; H 10.28%; N 10.13% theory C 71.90%; H 10.38%; N 10.06%.

NMR spectra show that, in the azo coupling, exclusively the compound 2,4-dinitro-5-N,N-bis(octadecylamino)-4', -N',N'-dimethylaminoazobenzene and no other isomer is formed.

Physical data:

Differential calorimetry (1K/min) melting point 36° C.

solidification point 3° C.

afterwards reversible polymorphism on heating:

(1) endothermic transition 9° C.

(2) exothermic transition 11° C.

(3) exothermic transition 27° C.

(4) endothermic transition 36° C. (melting point).

Example 2.2: Preparation of 2,4-dinitro-5-N,N-bis(docosylamino)-4'-N',N'-dimethylaminoazobenzene The procedure of Example 2.1 is repeated, using the corresponding aniline derivative of Example 1.2 in place of 2,4-dinitro-5-amino-N,N-bis(octadecylaniline). A deep red, wax-like substance is obtained (yield: 22% of theory; m.p. 59°-62° C.).

Elemental analysis: calculated for $C_{58}H_{102}N_6O_4$ (mol. wt. 947.49): 73.52% C; 10.85% H; 8.87% N found: 73.50% C; 10.87% H; 8.62% N.

Example 2.3: Preparation of 2,4-dinitro-5-N,N-methyldocosylamino-4'-N',N'-dimethylaminoazobenzene The procedure of Example 2.1 is repeated, using the aniline derivative of Example 1.3 in place of 2,4-dinitro-5-amino-N,N-bis(octadecylaniline). Red crystals are obtained (yield: 31% of theory; m.p. 76°-79° C.).

Elemental analysis: calculated for $C_{37}H_{60}N_6O_4$ (mol. wt. 652.92): 68.06% C; 9.26% H; 12.87% N found: 67.71% C; 9.32% H; 12.64% N.

Example 2.4: Preparation of 2,4-dinitro-5-N-docosylamino-4'-N',N'-dimethylaminoazobenzene The procedure of Example 2.1 is repeated, using the aniline derivative of Example 1.4 in place of 2,4-dinitro-5-amino-N,N-bis(octadecylaniline). For purification, the crude product is chromatographed over the 100-fold amount of silica gel with a 9:1 mixture of hexane/ether as eluant. A red solid is obtained (yield: 6% of theory; m.p. 86°-88° C.).

Elemental analysis: calculated for $C_{36}H_{50}N_6O_4$ (mol. wt. 630.84): 68.54% C; 7.99% H; 13.32% N found: 67.16% C; 9.02% H; 13.19% N.

Preparation of thin layers and liposomes

Example 3: Production of monolayers and LB multilayers

A preparative Lauda film balance is used for producing monolayers on the water/gas interface. The requisite very pure water is freshly prepared with a Milli-Q system (ex Millipore). The monomolecular film is produced by dropping a spreading solution [28.85 mg of 2,4-dinitro-5-N,N-bis(octadecylamino)-4'-N',N'-dimethylaminobenzene in 25 ml of $CHCl_3$ (ex Merck Uvasole)] on to the surface of the water by standard techniques. Surface-pressure-area diagrams are recorded at different temperatures after each evaporation of the solvent. The substance forms stable monolayers on pure water in the temperature range from 5° to 35° C. The collapse area is 0.49 $nm^2$/molecule at 20° C. and the collapse pressure is 20 mN/m. At 20° C. the monolayer is transferred to solid substrates at a surface pressure of 16 mN/m. This is done by dipping a quartz plate (Suprasil), which has been made hydrophobic beforehand with octadecyl trichlorosilane, at a speed of 4 cm/min through the monolayer and withdrawing it again. The procedure is repeated 15 times to give thin LB films of 2,4-dinitro-5-N,N-bis(octadecylamino)-4'-N',N'-dimethylaminoazobenzene which are initially deep bluish-violet in colour and, on storage at room temperature, undergo transition to a modification of more reddish blue. The absorption of longest wavelength of the freshly prepared layer is at 562 nm. The $\lambda_{max}$ of the modification obtained by storage at room temperature is 540 nm. The layer spacing of two bilayers determined by X-ray small angle scattering is 5.20±0.02 nm. A sample prepared from 15 bilayers thus has a thickness of 78 nm.

Example 4: Preparation of thin crystalline films

On a heating stage, 15 mg of 2,4-dinitro-5-N,N-bis(octylamino)-4'-N',N'-dimethylaminoazobenzene are fused on a quartz plate which has been made hydrophobic with octadecyltrichlorosilane and then is covered with a second plate that has also been made hydrophobic. The two plates are pressed together at a temperature above the melting point until the substance has spread as a thin film, which is cooled.

Example 5: Preparation of mixed liposomes 8 mg of dioctadecyl dimethylammonium bromide and 2 mg of 2,4-dinitro-5-N,N-bis(octadecylamino)-4'-N',N'-dimethylaminoazobenzene are weighed in together and dissolved in 10 ml of $CHCl_3$.2 ml of this solution are transferred to a test tube and a film is deposited on the wall of the test tube by expelling the solvent in a stream of nitrogen. This film is subsequently dried for 30 minutes at 0.1 mbar. Then 1 ml of Milli-Q water is added and ultra-sonication is effected for 15 minutes at 60° C. while blowing in nitrogen. A red, slightly opaque solution is obtained.

Colour changes

Example 6: Thermochromism in the crystalline film

The UV spectrum of 2,4-dinitro-5-N,N-bis(octadecylamino)-4'-N',N'-dimethylaminoazobenzene shows three characteristic bands in the crystalline film in the range from 200 to 800 nm. $\lambda_{max}$ is 525 nm at 20° C. By gradual heating to 50° C., $\lambda_{max}$ is displaced to 467 nm, while extinction remains about the same. Three isobestic points occur at 497, 368 and 294 nm. The colour changes on heating and cooling are reversible many times.

Example 7: Thermochromism in LB multilayers

When gradually heating a freshly prepared multilayer of 40 bilayers of 2,4-dinitro-5-N,N-bis(octadecylamino)-

4'-N',N'-dimethylaminoazobenzene, $\lambda_{max}$ 562 nm at 18° C. shifts to 480 nm at 36° C. On cooling to 20° C., $\lambda_{max}$ shifts to 540 nm. The colour changes on heating and cooling are reversible many times in the range from 540 to 480 nm. When heating above 36° C., the multilayer is destroyed.

Example 8: Colour changes in LB multilayers by treatment with a mixture of HCl/air Brief exposure of a multilayer of 2,4-dinitro-5-N,N-bis(octadecylamino)-4'-N',N'-dimethylaminoazobenzene, stored at room temperature, to a mixture of HCl/air effects a shift of $\lambda_{max}$ 540 nm to 480 nm. When the multilayer is left to stand in pure air, $\lambda_{max}$ reverts to 540 nm. The colour changes in HCl/air mixtures can be repeated many times.

Example 9: Colour changes in LB multilayers by treatment with a mixture of $CH_2Cl_2$/air Brief exposure of a multilayer of 2,4-dinitro-5-N,N-bis(octadecylamino)-4'-N',N'-dimethylaminoazobenzene, stored at room temperature, to a mixture of $CH_2Cl_2$/air effects a shift of $\lambda_{max}$ 540 nm to 480 nm. When the multilayer is left to stand in pure air, $\lambda_{max}$ reverts to 540 nm.

Example 10: Visual assessment of defects in LB multilayers

A substrate with microdefects is used for the preparation of multilayers (dust particles, incomplete or poor hydrophobic finish). The violet LB multilayers obtained after deposition of 2,4-dinitro-5-N,N-bis(octadecylamino)-4'-N',N'-dimethylaminoazobenzene are bright red around the defects. As the bright red zones are many times larger than the area of the defect (e.g. dust particle), defects are more easily visualised, some even with the naked eye.

Example 11: Optical anisotropy of LB multilayers

A LB multilayer composed of 40 bilayers of 2,4-dinitro-5-N,N-bis(octadecylamino)-4'-N',N'-dimethylaminoazobenzene is prepared as described in Example 3. After storage at room temperature, the multilayer has an absorption maximum at $\lambda_{max}$ 540. In the direction of dipping, the optical density of the absorption maximum $OD_{540}$ (11)=0.50; vertically to the direction of dipping, the optical density $OD_{540}$ (±)=0.19. The layers are therefore suitable for use as polariser.

What is claimed is:

1. A molecular aggregate of a compound of the formula

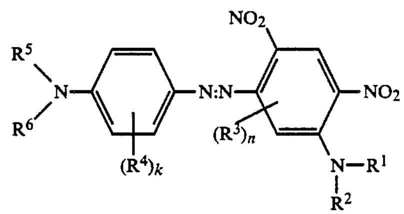

wherein $R^1$ is $C_{12}$–$C_{30}$alkyl, $R^2$ is hydrogen or $C_1$–$C_{30}$alkyl, $R^3$ is $C_1$–$C_3$alkyl or $C_1$–$C_3$alkoxy, $R^4$ has one of the meanings of $R^3$ or is halogen, k and n are each independently of the other 0, 1 or 2, and $R^5$ and $R^6$ are each independently of the other $C_1$–$C_4$alkyl, wherein the alkyl groups of $R^1$, $R^2$, $R^3$, and $R^4$ have the meanings above or are partly fluorinated or perfluorinated, with the proviso that $R^1$ is alkyl of not less than 18 carbon atoms if $R^2$ is hydrogen or alkyl of less than 12 carbon atoms, wherein said aggregate is assembled in the form of mixed liposomes, microcrystalline films or Langmuir-Blodgett layers.

2. Molecular aggregates according to claim 8, which are assembled in the form of multilayer systems that are obtainable by the Langmuir-Blodgett technique.

* * * * *